R. C. LANPHIER.
ELECTRICAL INDICATING INSTRUMENT.
APPLICATION FILED SEPT. 21, 1907.
910,549.
Patented Jan. 26, 1909.
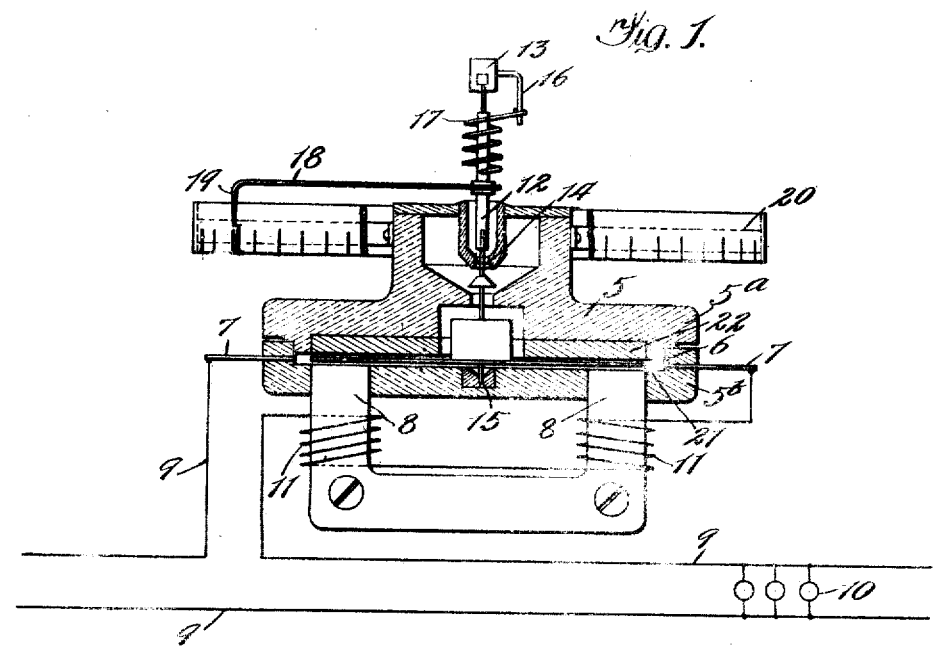
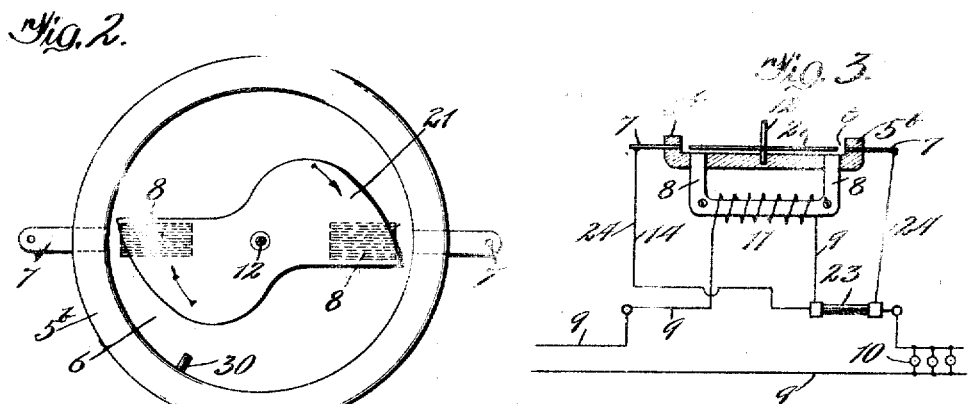
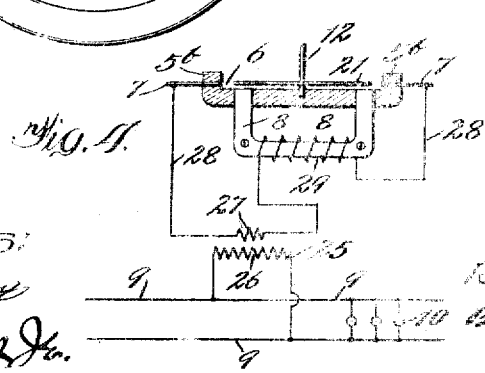

UNITED STATES PATENT OFFICE.

ROBERT C. LANPHIER, OF SPRINGFIELD, ILLINOIS, ASSIGNOR TO SANGAMO ELECTRIC COMPANY, OF SPRINGFIELD, ILLINOIS, A CORPORATION OF ILLINOIS.

ELECTRICAL INDICATING INSTRUMENT.

No. 910,549.　　　Specification of Letters Patent.　　　Patented Jan. 26, 1909.

Application filed September 21, 1907. Serial No. 393,997.

*To all whom it may concern:*

Be it known that I, ROBERT C. LANPHIER, a citizen of the United States, residing at Springfield, in the county of Sangamon, State of Illinois, have invented certain new and useful Improvements in Electrical Indicating Instruments, of which the following is a specification, reference being had to the accompanying drawings.

My invention relates to electrical measuring instruments such as those ordinarily used for indicating momentary values of volts, amperes, or watts in a circuit. In instruments of this class, it has been found practical to make direct current ammeters and volt meters whose indicating scales have uniform divisions over any desired range. A common and well-known type of such instruments is the so-called D'Arsonval permanent magnet type. This type of indicating instrument, however, cannot be used with an alternating current. Many forms of alternating current indicating instruments have been devised, however, but no one of them, so far as I am aware, has been of the mercury motor meter type. A device of the mercury motor meter type, by making appropriate changes and additions, of course, can be made to operate as a watt or ammeter for a direct current, because the energizing field may be energized by a shunt circuit, passing the load current through the mercury chamber and across the disk armature. To apply such a device with the ordinary form of armature, however, to an alternating current, would give rise to difficulties, making it impossible to use a scale of substantially uniform divisions, except by the use of cams, or more or less complicated mechanisms for changing the movement of the index finger from the actual ratio of deflective forces. The reason for this is that, in such a device in use in an alternating current, it would be practically necessary to pass through the moving element or armature the same current which passes through the main or series winding of the device, or to induce in the moving element a magnetism varying practically in proportion to the current. It would result from this that the operation of such a device, as is well known, would follow the law of squares,—that is to say, the torque or turning moment upon the shaft would increase with the square of the energizing current, of approximately thereto. Instead, therefore, of giving a uniform scale of deflection, which would be the case if the torque varied directly in proportion with the current, it results that with such instruments the divisions of the scale must increase rapidly unless some cam or other mechanism is employed between the turning element and the indicating needle to compensate for this. It follows again from this that a sufficiently wide scale cannot be obtained within any convenient size of scale.

It is the object of my invention, therefore, to produce an indicating instrument, primarily intended for alternating current but also applicable for an ammeter for direct current, in which a scale of practically uniform divisions may be used; or in which scale deflections of almost any desired ratio of increase proportional to the volts or amperes upon a circuit may be used. Generally speaking, I accomplish this by constructing an instrument which is of the mercury motor meter type, the armature, however, being so shaped that its successive radii diminish in length as said disk rotates in such relation to the driving power produced by the combined current and field effect that the torque of said current and field upon said armature shall increase directly as the current increases, thereby eliminating the operation of the normal law of squares in the deflection of the indicating finger and making possible, as has been said, a practically uniform scale.

I accomplish these objects by the means shown in the drawings and hereinafter described.

That which I believe to be new will be set forth in the claims.

In the drawings:—Figure 1 is a side elevation of my device, partially in vertical section, and showing a part of the scale removed to show the parts within. Fig. 2 is a top or plan view of the bottom part of the case, the top part with its contained and supported devices being removed. Fig. 3 is a diagrammatic illustration of my device applied with a shunt. Fig. 4 is a diagrammatic view illustrating my invention, showing its application in an alternating current volt meter.

Referring to the drawings, 5 indicates a casing formed of insulating material and consisting of an upper and a lower part, 5ᵃ and 5ᵇ, respectively.

6 indicates a shallow circular chamber in the casing 5 adapted to contain mercury and to contain the armature hereinafter described.

7—7 indicate contacts which preferably enter the chamber from the sides diametrically opposite one another.

8—8 indicate laminated pole pieces of an electro-magnet which are mounted in the bottom member 5<sup>b</sup> of the casing and project through the same to the bottom of the chamber 6.

9 indicates the main circuit with translating devices 10.

11 indicates the field windings of the magnet which are connected in the circuit in series with the contacts 7.

12 indicates a spindle which is journaled in suitable bearings 13—14—15, and projects upward through the casing. The bearing 13 is mounted in any suitable manner in the other parts of the casing of the meter, which are all omitted for clearness of illustration and may be of any well-known form and type and will be readily understood.

16 indicates a pin which is secured rigidly to the bearing 13 and projects downward beside the spindle 12.

17 indicates a coiled spring, one end of which is secured to the spindle 12 and the other end to the pin 16.

18 indicates a pointer which is secured to the spindle and projects horizontally therefrom, being bent over at its outer end 19 to traverse an arc-shaped scale 20 which is secured to the casing of the meter in any appropriate manner. As has been said, the casing and other parts are of any well-known form of description, and, as they will be readily understood and form no part of my present invention, they are omitted for the sake of clearness of illustration.

21 indicates an armature formed of a thin plate of conducting metal, preferably copper, and secured upon the spindle 12 near its lower end so as to rotate in the chamber 6. As is best shown in Fig. 2, the armature is preferably symmetrical upon both sides of the spindle, in order that the current from the contacts,—which, as has been said, are preferably located diametrically opposite each other,—may pass across the entire diameter of the armature and render effective both magnetic fields. As is best shown in Fig. 2, the edge of the armature upon each side of the spindle, and forward in the direction of rotation indicated by arrows in Fig. 2, is straight from the edge to a point near the spindle, while the other edge of the armature is curved in substantially an involute curve whose successive radii away from the straight edge diminish in length in such relation to the driving power produced by the combined current and field effect that the effective torque of said current and field upon said armature shall increase directly as the current increases.

22 indicates a return plate of magnetic material which is embedded or otherwise fixed in the upper member 5<sup>a</sup> of the casing 5.

30 indicates a stop in said chamber adapted to limit the rotation of the armature.

The operation of the device is as follows:— The parts are so set that when there is no current passing and the pointer is consequently at zero on the scale, the disk will be in the position shown in Fig. 2. In this position it is obvious that the armature will have its maximum length subjected to the maximum area of fields from the adjacent poles of the magnet, and upon the passing of the current, the said disk will be turned against the action of the spring 17, moving the pointer over the scale in proportion to the amount of the current. As the current increases to increase the turning of the disk and to cause the further moving of the pointer upon the scale, it will be seen that both the effective element of the armature through which the load current is passing is decreasing, and at the same time the area of the magnetic field acting upon such armature is also decreasing. By this means, the desired resultant of proportional scale deflection may be obtained and the scale 20 may be made with substantially equal divisions.

Fig. 3 illustrates my invention as operated with a shunt on an alternating current similar to the ordinary use of shunts in direct current ammeters, showing the entire current carried through the series field windings and only the armature current shunted. In this case, 23 indicates a resistance shunt and 24 indicates the circuit from the resistance shunt through the contacts and armature. In all other respects, the parts are similarly numbered to the corresponding parts shown in Fig. 1.

It is obvious that in case it should be desired to apply this indicating instrument upon a direct current, the entire device, both the armature and series field windings, could be shunted, as in that case there would be no inductive effect from the series coil to cause error.

In Fig. 4, I have shown my mechanism as applied to an alternating current volt meter. In this diagrammatic view, 5 indicates the casing, 6 the chamber, 7 the contacts, 8 the laminated pole pieces, 9 the main circuit, 10 the translating devices, 12 the spindle, and 21 the armature, the parts being numbered the same as corresponding parts in Fig. 1. 25 indicates a transformer, of which the primary 26 consists of a large number of turns of fine wire connected across the circuit 9, and the secondary 27 of one or two turns of large wire so constructed as to furnish a current of very low potential but of some fifteen to twenty amperes to the armature. 28 indicates the circuit from the low potential secondary of the transformer, and 29 the field windings which are in series with the contacts 7.

I have described my invention as applied to alternating current measuring instruments, and it is the principal object of my invention to provide for such a measuring instrument for alternating currents. It will be obvious however, that my measuring instrument is equally applicable to direct current measurement, and I therefore do not confine its application to its use with alternating currents.

What I claim as my invention and desire to secure by Letters Patent is:—

1. In an electrical indicating instrument, the combination with a chamber adapted to contain a conducting fluid, contacts entering said chamber, field poles, field windings in series with said contacts, a spindle, and indicating devices operatively connected therewith, of an armature secured to said spindle in said chamber and so shaped that its successive radii diminish in length whereby the effective path of the current passing through said armature decreases in length as the current increases.

2. In an electrical indicating instrument, the combination with a chamber adapted to contain a conducting fluid, contacts entering said chamber, field poles, field windings in series with said contacts, a spindle, a spring connected to said spindle and adapted to resist the turning thereof, and indicating devices operatively connected with said spindle, of an armature secured to said spindle in said chamber and so shaped that its successive radii diminish in length whereby the effective path of the current passing through said armature decreases in length as the current increases.

3. In an electrical measuring instrument provided with a mercury chamber, the combination of a field magnet, a swinging metallic vane immersed in the mercury, and contacts adapted to carry the current to and from said vane, the vane being so shaped that its successive radii diminish in length whereby the effective path of the current passing through said vane decreases in length as said current increases.

4. In an electrical measuring instrument, the combination with a field magnet, of a vane pivoted to swing in the field of said magnet, and means for conducting current through said vane, said vane being so shaped that its successive radii progressively diminish in length whereby the effective path of the current passing through said vane decreases in length as the current increases.

5. In an electrical measuring instrument, the combination with a field magnet, of a vane pivoted to swing in the field of said magnet, and means for conducting a current through said vane, said vane having one of its edges so shaped that the successive radii progressively diminish in length as the vane rotates, whereby the effective path of the current passing through said vane decreases in length as the current increases.

6. In an electrical measuring instrument, the combination with a field magnet, of a vane connected in series with said magnet and mounted to swing in the field thereof, said vane being so shaped that the successive radii progressively diminish in length whereby the effective path of the current passing through said vane decreases in length as the current increases.

ROBERT C. LANPHIER.

Witnesses:
BERTHA O. LANPHIER,
MARGARET E. CONLISK.